D. STEWART.
NUT OR PIPE WRENCH.
APPLICATION FILED OCT. 8, 1907.
904,816.
Patented Nov. 24, 1908.
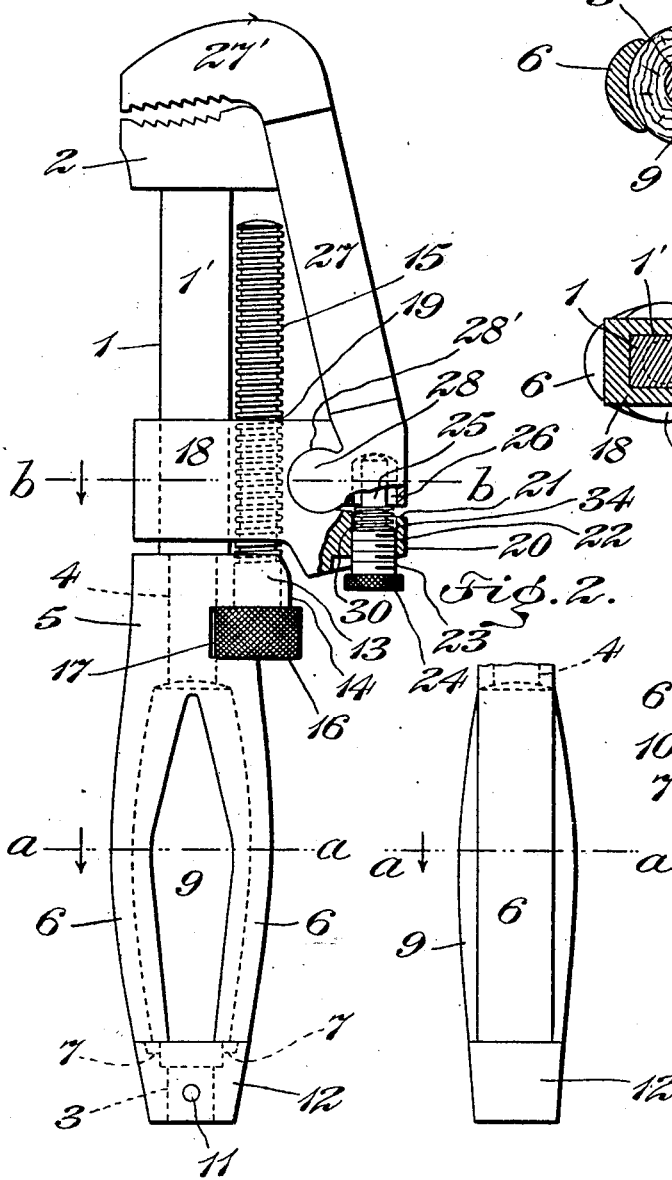
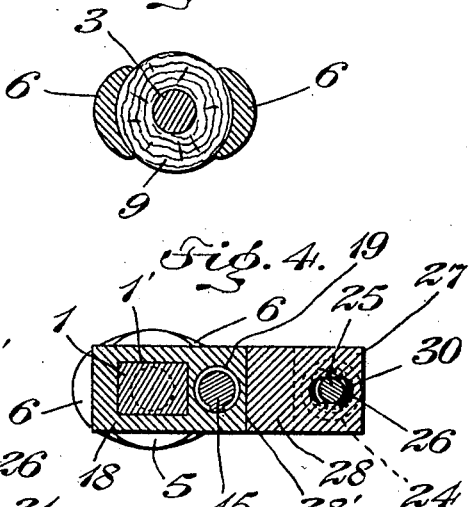
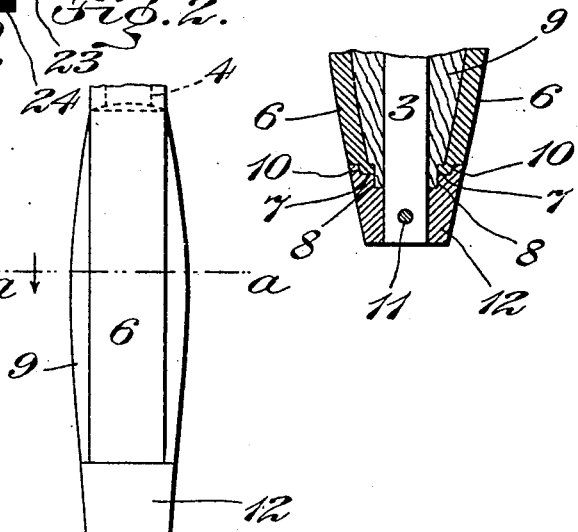
WITNESSES
INVENTOR
David Stewart
BY
ATTORNEY

UNITED STATES PATENT OFFICE.

DAVID STEWART, OF SCHENECTADY, NEW YORK, ASSIGNOR TO STEWART WRENCH & MFG. CO., OF ALBANY, NEW YORK, A CORPORATION OF NEW YORK.

NUT OR PIPE WRENCH.

No. 904,816. Specification of Letters Patent. Patented Nov. 24, 1908.

Application filed October 8, 1907. Serial No. 396,405.

*To all whom it may concern:*

Be it known that I, DAVID STEWART, a citizen of the United Kingdom of Great Britain and Ireland, residing at Schenectady, county of Schenectady, State of New York, have invented a certain new and useful Improvement in Nut or Pipe Wrenches, of which the following is a specification, such as will enable others skilled in the art to which it appertains to make and use the same.

The object of my invention is to provide a nut or pipe-wrench of the rocking-jaw-type, of a simple and cheap form of construction, of great variability of jaw-width, in which the pivot joint of the rocking or pivot-jaw, while of great simplicity and strength, will also permit of easy disassembling of the parts; and in which the jaws of the wrench may be easily and quickly locked firmly upon the nut or pipe to be turned by the wrench, and which, while provided with a wooden or non-metallic grip handle, will have such wooden handle fully protected against injury.

To such ends my invention consists in substance, of a rectangular slide bar provided at one end with a jaw head and at the other with a tang, a slide-piece or sleeve sliding on the slide-bar, a jaw-piece having a head similar to the jaw-head of the slide-bar and coacting therewith and pivoted to the slide piece or sleeve by a non-pivot-pin dovetail rock-joint, abutting shoulders on the heels of the sliding-sleeve and on the jaw-head piece for preventing extreme backward movement thereof, a spring normally forcing the jaw-piece toward the slide-bar, a combined securing and set-screw provided with a thumb-nut working in a female thread in the heel of the sliding-sleeve, passing through the heel in a securing cavity in the heel of the pivot jaw-piece, a metallic handle boss having two resilient side wing-pieces, crescent shaped in cross section through which the tang of the slide-bar passes, and also two upper rearwardly extending wings or prongs, a passage through the slide-piece or sleeve provided with a female screw thread located between the slide-bar and the pivot jaw-piece, an adjusting screw working in this screw threaded passage, and having a thumb-nut abutting against the rearward faces of the wings or prongs of the handle boss, a non-metallic grip-piece interposed between the tang of the slide bar and the resilient wing pieces of the handle boss, a metallic securing thimble forcing the ends of the wing pieces toward one another upon the grip-piece, and a securing pin passing through the thimble and the end of the slide-bar tang; although it is not to be understood that the invention is necessarily limited to a device comprising at once all of the elements before enumerated, as the same consists in the particular construction of certain devices and parts, and the particular construction, combination and arrangement of certain devices and parts, all as hereinafter more particularly set forth in the specification, and pointed out in the claims.

My said invention is fully set forth in the following specification, of which the accompanying drawings form a part, wherein similar numerals of reference designate like or equivalent parts wherever found throughout the several views, and in which—

Figure 1 is a side view of my improved wrench, partly in section; Fig. 2 is a front view of the handle portion thereof; Fig. 3 is a view of the handle portion in section on the line *a—a* of Figs. 1 and 2; Fig. 4 is an end view of the wrench taken on the line *b—b* of Fig. 1 and Fig. 5 is a view in detail of the wooden grip-piece of the handle portion.

Referring to the drawings:—The reference numeral 1 designates the slide-bar, having at one end the jaw-head 2, usually formed integral therewith, and at the other a tang 3 preferably of cylindrical form, between which and the rectangular slide portion 1' is a smaller rectangular boss-tang 4 fitting into a like shaped cavity in the metallic handle-boss 5, from which extend the resilient side wing-pieces 6 of crescent shape in cross section, and which are each provided at the extreme end with an upwardly turned securing flange 7, at the end of a chamfer 10 which flanges fit into a chamfer 8, on the end of the wooden or other non-metallic grip piece 9, held in position between the wing pieces 6.

The grip-piece 9 is usually of the form shown, viz: that of two truncated cones joined base to base, so as to have the bellying central portion at *a—a*, when the same is in position, extend beyond the wing-pieces 6, so that the hand may securely grip the same. The grip-piece is also provided with a central cylindrical bore, through which passes so as to fit tightly therein the cylindrical tang 3 of the slide bar 1, on the lower end of which tang is rigidly secured by a pin 11 a metallic thimble 12, fitting over the chamfer 10 of the wing-pieces 6 so as to force the flanges 7 into the chamfer 8 of the grip-piece 9.
Extending from the handle boss 5 above one of the wing pieces 6 are two thumb-nut wings or prongs 13 between which is the adjusting screw cavity 14 in which rotates the adjusting screw 15, having the milled thumb-head or nut 16, fitting into and rotating freely in the thumb-nut cavity 17 formed in the handle-boss 5 just below the thumb nut wings or prongs 13.

Sliding on the rectangular slide portion 1' of the slide-bar 1, is the slide-piece or sleeve 18, usually of the form shown, which is provided with a screw threaded cavity 19, through which passes and in which works the threaded portion of the adjusting screw 15.

In the rear heel or abutting shoulder portion 20 of the sleeve 18, which is usually of the shape shown and provided with a slanting abutting surface 21, is a screw threaded cavity 22 in which works a combined securing and set-screw 23, having the milled thumb-nut or head 24, and the unthreaded securing and setting end portion 25 of which extends into a securing cavity 26 formed in the heel of the pivot jaw-piece 27 provided with a jaw-head 27', which jaw-piece is pivoted to the slide-piece or sleeve 18 by a rounded dovetail pivot lug 28, formed integral therewith and vibrating freely but snugly in a like shaped dovetail cavity 28' formed in the rear of the slide-piece or sleeve 18.

The cavity 26 is of less diameter on a line parallel with the axis of the dovetail pivot lug, than it is upon a line at right angles thereto, as clearly shown in Fig. 4, and the securing screw 23 is provided at the upper end of the threaded portion with a shoulder 34, on which rests a coil-spring 30, which is of the same diameter as the cavity in its smallest diameter, and this spring is always kept under tension so as to normally force the pivot jaw-piece forward toward the slide-bar, thus closing the jaws; and by this arrangement while the pivot jaw-piece will be free to rock back and forth upon the pivot joint formed by the dovetail, the same cannot move sidewise out of the sliding-piece or sleeve until the securing screw is removed, and it will also be seen that when such securing screw is screwed fully into the cavity, the end thereof will force the pivot jaw-piece forward and thus lock the jaws firmly upon the nut or pipe.

While in many cases and for many reasons the spring 30 is desirable, it may be omitted, in which case the end of the securing pin is of course made to fit snugly in the smaller diameter of the cavity 26.

By withdrawing the securing screw 23, the pivot jaw-piece may be removed from the slide-piece or sleeve 18 by slipping the dovetail pivot lug 28 sidewise out of the cavity 28', then by driving out the pin 11, the thimble 12 may be removed, and a sharp blow or two upon the end of the tang 3 will disengage the slide-bar from the handle-portion, and then if desired the wooden grip piece may be pried out from between the wing-pieces 6 of the handle-boss, between which it has been forced from the bottom; and the reassembling is of course the reverse of this operation.

The grip-piece may be of wood, or any other suitable material, and the other parts are of metal such as iron or steel, and the grip-piece may be formed of one piece or two pieces, and in the latter case the joining line is of course covered by the wing pieces 6.

What I claim is:

1. In a wrench, a slide-bar, a jaw-head on the slide-bar, a slide-piece or sleeve sliding on the slide-bar and a pivot jaw-piece pivoted to the slide-piece or sleeve by a rounded dovetail lug formed integral with such pivot jaw-piece, a rearwardly extending heel on the slide-piece or sleeve abutting against the heel of the pivot jaw-piece when the same is rocked rearward, and a combined securing and thumb-nut set-screw working in a threaded cavity through the heel of the slide-piece or sleeve, the end of which lies in a cavity of greater diameter from front to rear than from side to side formed in the heel of the pivot jaw-piece.

2. In a wrench, a slide-bar, a jaw-head on the slide-bar, a slide-piece or sleeve sliding on the slide-bar, and a pivot jaw-piece pivoted to the slide-piece or sleeve by a rounded dovetail lug formed integral with such pivot jaw-piece, and a spring normally forcing the pivot jaw-piece towards the slide-bar.

3. In a wrench, a slide-bar, a jaw-head on the slide-bar, a slide-piece or sleeve sliding on the slide-bar, and a pivot jaw-piece pivoted to the slide-piece or sleeve by a rounded dovetail lug formed integral with such pivot jaw-piece, a rearwardly extending heel on the slide-piece or sleeve abutting against the heel of the pivot jaw-piece when the same is rocked rearward, and a combined securing and thumb-nut set-screw working in a threaded cavity through the heel of the slide-piece or sleeve, the end of which lies in a cavity of greater diameter from front to rear than from side to side formed in the heel of the pivot jaw-piece, and a spring normally forcing the pivot-jaw-piece towards the slide bar.

4. In a wrench, a slide-bar, a jaw-head on the slide-bar, a slide-piece or sleeve sliding on the slide-bar, an adjusting screw working in a threaded cavity through the slide-piece or sleeve between the slide-bar and pivot jaw-piece, a pivot jaw-piece pivoted to the slide-piece or sleeve by a rounded dovetail lug formed integral with the pivot jaw-piece, a rearwardly extending heel on the slide-piece or sleeve abutting against the heel of the pivot jaw-piece when the same is rocked rearward, and a combined securing and thumb-nut set-screw working in a threaded cavity through the heel of the slide-piece or sleeve, the end of which set-screw lies in a cavity of greater diameter from front to rear than from side to side formed in the heel of the pivot jaw-piece.

5. In a wrench, a slide-bar, a jaw-head on the slide-bar, a slide-piece or sleeve sliding on the slide-bar, an adjusting screw working in a threaded cavity through the slide-piece or sleeve between the slide-bar and pivot jaw-piece, and a pivot jaw-piece pivoted to the slide-piece or sleeve by a rounded dovetail lug formed integral with the pivot jaw-piece, and a spring normally forcing the pivot jaw-piece toward the slide-bar.

6. In a device of the class described, a metallic handle-boss having side wing-pieces or tangs of substantially crescent shape in cross-section, a substantially cylindrical hollow bored non-metallic grip-piece inclosed by the side wing-pieces or tangs, a tool tang passing through the grip-piece, and a metallic thimble secured upon the end of the tang so as to cover the ends of the side-wings or tangs of the handle-boss and of the grip-piece.

7. In a device of the class described, a metallic handle-boss having side wing-pieces or tangs of substantially crescent shape in cross-section, a substantially cylindrical hollow bored non-metallic grip-piece smaller at the ends than at the center, inclosed by the side wing-pieces or tangs, a tool tang passing through the grip-piece, and a metallic thimble secured upon the end of the tang so as to cover the ends of the side-wings or tangs and of the grip-piece.

8. In a wrench, a thumb-nut adjusting screw, a handle-piece comprising a metallic boss having at one side of the upper end a thumb-nut recess the top prong of which is slotted to receive the adjusting screw, side wing-pieces or tangs of substantially crescent shape in cross-section extending from the handle-boss, a chamfer and an inwardly extending securing flange on the end of each side wing-piece or tang, a hollow bored substantially cylindrical shaped non-metallic grip-piece smaller at the ends than at the middle, chamfered at the end to receive the end flanges of the side wing-pieces or tangs located between such side wing-pieces or tangs, a slide-bar the tang of which passes through the bore of the grip-piece, and a metallic thimble covering the ends of the side wing-pieces and grip-piece secured to the tang.

9. In a wrench, a thumb-nut adjusting-screw, a handle-piece comprising a metallic boss having at one side of the end a thumb-nut recess the top prong of which is slotted to receive the adjusting screw, side wing-pieces or tangs of substantially crescent shape in cross-section extending from the handle-boss, a hollow bored substantially cylindrical shaped non-metallic grip-piece smaller at the ends than at the middle, located between such side wing-pieces, a slide-bar the tang of which passes through the bore of the grip-piece, and a metallic thimble covering the ends of the side wing-pieces or tangs and grip-piece secured to the tang.

10. In a wrench, a thumb-nut adjusting screw, a handle-piece comprising a metallic boss having at one side of the upper end a thumb-nut recess the top prong of which is slotted to receive the adjusting screw, side wing-pieces or tangs of substantially crescent shape in cross-section extending from the handle-boss, a chamfer and an inwardly extending securing-flange on the end of each side wing-piece or tang, a hollow bored substantially cylindrical shaped non-metallic grip-piece smaller at the ends than at the middle chamfered at the end to receive the end flanges of the side wing-pieces or tangs located between such side-wing pieces, a slide-bar the tang of which passes through the bore of the grip-piece, a metallic thimble covering the ends of the side wing-pieces or tangs, and grip-piece secured to the tang, a jaw-head on the slide-bar, a slide-piece or sleeve sliding on the slide-bar, and a pivot jaw-piece pivoted to the slide-piece or sleeve by a rounded dovetail lug formed integral with the pivot jaw-piece.

11. In a wrench, a thumb-nut adjusting screw, a handle-piece comprising a metallic boss having at one side of the upper end a thumb-nut recess the top prong of which is slotted to receive the adjusting screw, side wing-pieces or tangs of substantially crescent shape in cross-section extending from the handle-boss, a hollow bored substantially cylindrical shaped non-metallic grip-piece smaller at the ends than at the middle located between such side wing-pieces or tangs, a slide bar the tang of which passes through the bore of the grip piece, a metallic thimble covering the ends of the side wing pieces or tangs and grip-piece secured to the tang, a jaw-head on the slide-bar, a slide-piece or sleeve sliding on the slide-bar, and a pivot jaw-piece pivoted to the slide-piece or sleeve by a rounded dovetail lug formed integral with the pivot jaw-piece.

12. In a wrench, a slide-bar, a jaw-head on the slide-bar, a slide-piece or sleeve sliding on the slide-bar, and a pivot jaw-piece pivoted to the slide-piece or sleeve by a rounded dove-tail lug formed integral with such pivot jaw-piece, and means for securing the pivot jaw-piece against side movement in the slide-piece or sleeve.

13. In a wrench, a slide-bar, a jaw-head on the slide-bar, a slide-piece or sleeve sliding on the slide-bar, an adjusting screw working in a threaded cavity through the slide-piece or sleeve between the slide-bar and pivot jaw-piece, a pivot jaw-piece pivoted to the slide-piece or sleeve by a rounded dove-tail lug formed integral with such pivot jaw-piece, and means for securing the pivot jaw-piece against side movement in the slide-piece or sleeve.

Signed this 7th day of Sept. 1907.

DAVID STEWART.

Witnesses:
JOHN McKILLOP,
WILLIAM GETTY.